Figure 1:
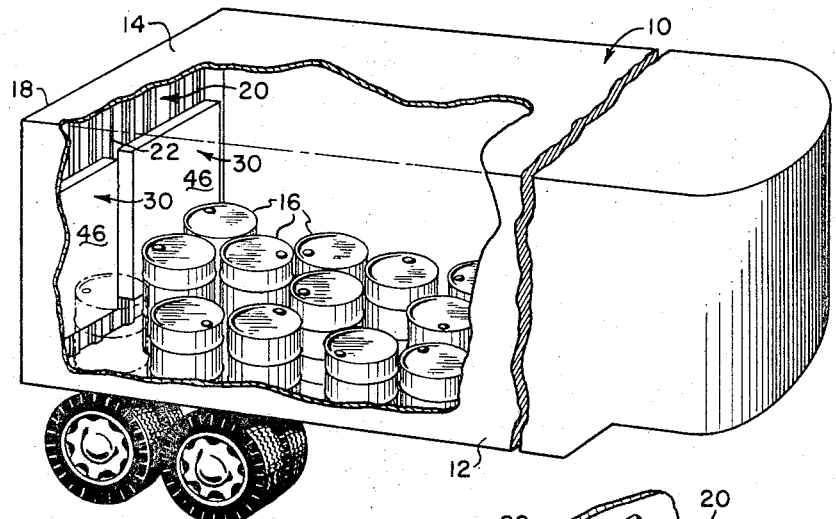

INVENTORS
PALMER BAYER
JOSEPH D. SCOTT
BY Samuelson & Jacob
THEIR ATTORNEYS

United States Patent Office 3,336,069
Patented Aug. 15, 1967

3,336,069
PROTECTIVE CUSHIONING DEVICES
Palmer Bayer, Westfield, and Joseph D. Scott, Highlands, N.J., assignors to Rea Leasing Corporation, New York, N.Y., a corporation of Delaware
Filed June 30, 1965, Ser. No. 468,542
9 Claims. (Cl. 296—24)

The present invention relates generally to cushioning devices and pertains more specifically to protective cushioning devices employed in cargo-carrying vehicles for attenuating shocks ordinarily applied to the walls of such vehicles as a result of the shifting of cargo within the vehicles.

While cargo-carrying vehicles such as, for example, truck trailers, are generally designed to withstand the stresses imposed upon their structural members by the cargo contacting the structural members during ordinary service of the vehicles, it has been found that under certain operating conditions, at least portions of the structure of such vehicles are subjected to greater structural impact loads with resulting considerable damage. For example, truck trailers designed ordinarily for highway use are now being employed in "piggyback" service, i.e., are now being transported on railroad cars while loaded with cargo, and are thereby subjected to generally greater structural impact loads than encountered in highway or over-the-road service. Thus, it has been found advantageous to have available simple and effective means for protecting currently available truck trailers against greater loads arising out of the impact of cargo upon the internal faces of the walls of such trailers during such exceptionally demanding service.

It is therefore an important object of the invention to provide simple and effective means for attenuating shocks applied to the structure of cargo-carrying vehicles as a result of the impact of shifting cargo within the vehicle.

Another object of the invention is to provide a protective cushioning device which can be economically and easily installed in conventional vehicles now in service to attain effective protection against increased impact loads arising out of exceptionally demanding service.

Still another object of the invention is to provide an integrated, readily installed protective cushioning device for protecting the walls of cargo-carrying vehicles.

A further object of the invention is to provide a protective cushioning device which will aid in protecting the shifting cargo from damage as well as protecting the cargo-carrying vehicle wall structure.

A still further object of the invention is to provide a protective cushioning device of simple, rugged construction capable of economical fabrication and dependable service.

The invention may be described briefly as a protective cushioning device for attenuating shocks ordinarily applied to a smaller portion of a rigid wall member having a larger given area, the device including resilient cushion means of flexible foam material for placement against the wall member over the given area, rigid plate means having an area substantially equivalent to the given area, and means for suspending the plate means contiguous with the cushion means, with the cushion means lying between the plate means and the wall member, for relative movement toward the wall member against the resilience of the cushion means in response to the application of such shocks to the plate means. The cushion means generally comprises a cushion fabricated of a flexible polyurethane foam.

Figure 2:
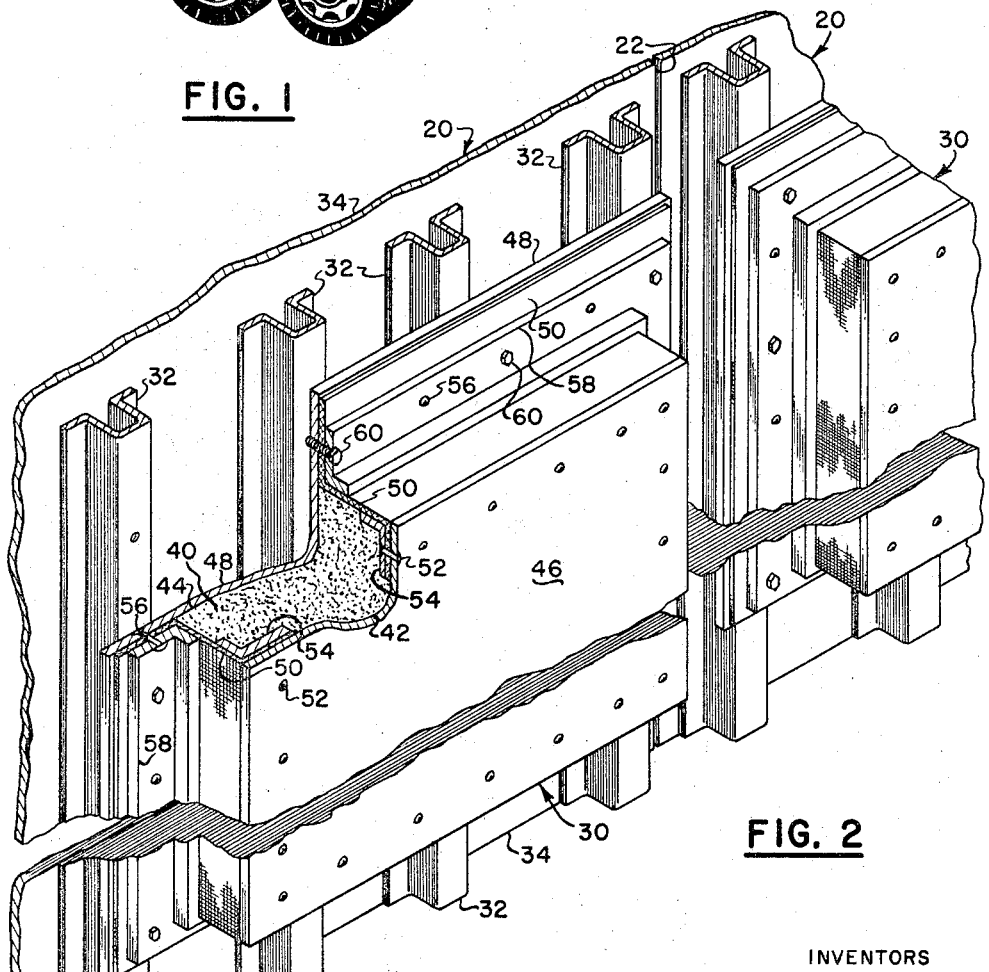

The invention will be more clearly understood and additional objects and advantages thereof will become apparent in the following detailed description of an embodiment of the invention illustrated in the accompanying drawings wherein:

FIGURE 1 is a partially sectioned, generally pictorial illustration of a protective cushioning device in service, the cushioning device being constructed in accordance with the invention; and FIGURE 2 is a partially sectioned enlarged perspective view illustrating the construction of the above protective cushioning device.

Referring now to the drawings, and particularly to FIGURE 1, a truck trailer body is illustrated generally at 10 with portions of the side 12 and top 14 removed to expose the internally carried cargo shown in the form of drums 16. At the rear end 18 of the trailer body 10 is a set of access doors 20, each of which is hinged to a side 12 so as to open from the central edge 22 outwardly in a conventional manner. During rapid accelerations and decelerations of the trailer body, the cargo will have a tendency to shift, such a shift being rearwardly during accelerations and forwardly during decelerations. It has been found that under certain strenuous operating conditions, such as the aforesaid "piggyback" service, these shifts of the cargo can cause the drums 16 to strike the forward and/or rearward walls of the trailer body 10 with considerable impact. Since the doors 20 are hinged to the body and are generally not as sturdily constructed as the remaining trailer body walls, damage has been found to occur as a result of the impact of the cargo against the trailer body doors. In order to reduce damage of the trailer body walls, and particularly to the doors 20 as a result of shocks arising out of the impact of drums 16 due to the shifting of the cargo, a protective cushioning device 30 is shown installed on the interior side of each door 20 so as to lie between the drums 16 and the doors 20 and absorb a greater part of the impact shock as the cargo shifts rearwardly.

As best seen in FIGURE 2, doors 20 are each constructed with a series of ribs or hat sections 32 which make up the frame of the door and an outer covering 34 which completes the door construction. Although the overall area of each door is relatively large, a drum 16, because of the overall configuration of the drum, will strike the door along only a relatively small portion of the larger given area of the door so that the shock of the impact of a drum against the interior of a door will be concentrated in a smaller area and will thus be capable of effecting greater impact load and hence more severe damage.

The protective cushioning device 30 was developed to attenuate such shocks by receiving impacts along relatively smaller areas and distributing the shock of such impacts over a larger area where the shocks can more readily be absorbed. To this end the protective cushioning device 30 is comprised of a cushion 40 of flexible foam material which is placed between the cargo and the door structure and has a relatively large area so as to absorb the shock of impacts resulting from the shift of drums 16 rearwardly toward doors 20. The cushion has a front face 42 facing the cargo and a rear face 44 facing the door 20. A rigid face plate member 46 is placed between the cargo and the cushion along front face 42 of the cushion to receive the impact and has an area corresponding to the relatively large area of the cushion 40 so that shocks applied to a relatively small area of face plate member 46 are distributed by the face plate member over the relatively large area of the front face 42 of cushion 40 and can thus be absorbed by the entire cushion rather than by a small area thereof. Since the hat sections 32 provide only a limited backing for the cushion 40, a relatively rigid backing plate member 48 is placed between the cushion 40 and the door structure contiguous with the rear face 44 of the cushion 40 to provide a continuous rigid backing for cushion 40. It is noted that should the door be designed with a continuous interior face rather than the ribbed structure of the exposed hat sections, the cushion could lie contiguous with the flat interior face of the door itself and no rigid backing plate member would be required.

As seen in the drawing, each protective cushioning device 30 is mounted vertically upon the interior of a door 20. In view of such a mounting position, the device must be assembled in such a way as to be self-supporting and yet still provide the cushioning effect which arises out of the ability of the rigid face plate member 46 to move rearwardly against the resiliency of cushion 40 without being hampered by structure necessary to maintain an assembled device. It has been found advisable to bond the face plate member 46 to the front face 42 of cushion 40 and to bond the backing plate member 48 to rear face 44 by means of an adhesive applied between the respective plate members and cushion faces. In addition to the adhesive bond, further means are provided for suspending the face plate member in proper relationship in the assembly for unhampered horizontal movement. As best seen in FIGURE 2, a flexible fabric 50 is fixed to the face plate member 46 and the backing plate member 48 around the perimeter of the cushion 40. The flexible fabric is fixed to the face plate member 46 by means of rivets 52 passing through rigid backing strips 54 and the fabric 50 such that the fabric 50 is clamped between the face plate member 46 and the backing strips 54. The fabric 50 is likewise attached to the backing plate member 48 by means of rivets 56 passing through rigid backing strips 58 and the fabric 50 such that the fabric 50 is clamped between the backing plate member 48 and the backing strips 58. In addition to performing the function of suspending face plate member 46 in the assembly, the fabric 50 provides a degree of protection to the edge of the cushion 40 along the perimeter thereof. The entire protective cushioning device assembly is shown fixed to the hat sections 32 by means of self-tapping screws 60 which pass through the rigid backing strips 58 and the backing plate member 48.

It will be apparent that a variety of materials can be employed in the fabrication of an operational protective cushioning device constructed in accordance with the invention. For example, the cushion 40 must be made of a material capable of resilient deflection and can be fabricated of one of a variety of commercially available flexible plastic foam materials such as a closed cell polyethylene foam, polyurethane foams and polyether and polyester flexible polyurethane cushioning foams. One successful material which exhibits good cushioning characteristics in reasonable dimensions is a polyether flexible polyurethane cushioning foam having a density of about 1.2 pounds per cubic foot. A single pad of such material having a thickness of about four inches has proved successful in attaining a high degree of shock attenuation over a good operational range. The face plate member 46 must be relatively rigid and capable of being struck by the cargo without excessive bending or failure so as to receive concentrated impact loads and spread such loads over the greater area of the cushion face and is best fabricated of plywood having a thickness of approximately ⅜ to ¾ of an inch. Other materials such as fiber glass reinforced polyester sheet or fiber glass reinforced epoxy sheet are also possible advantageous choices for the face plate member. The backing plate member 48 can likewise be fabricated of such material. For good flexibility and strength as well as toughness and resistance to abrasion, the flexible fabric 50 is best fabricated of a heavy gauge vinyl-impregnated polyamide fabric, one such polyamide being known commercially as "nylon."

It is noted that in the illustrated embodiment the dimensions of the protective cushioning device are such that it does not cover the entire area of the interior of each door 20. Although the protective cushioning device can be constructed to cover the entire area of the doors, as well as only the partial covering shown, it has been determined that for most ladings, it is unlikely that the upper thirty percent of the doors would be subjected to severe impact loads and the partial covering is sufficient. Additionally, protective cushioning devices having smaller areas are more universal and hence more easily installed in existing truck trailers of different manufacturers and, since they require less materials, are more economical to manufacture.

While the illustrated embodiment is shown installed in a truck trailer, it is obvious that protective cushioning devices constructed in accordance with the invention may be installed in other cargo-carrying vehicles, such as, for example, railroad cars where the protective cushioning devices could be installed upon cargo separating bulkheads. The protective cushioning device would also be installed upon side walls as well as the rear wall shown where impact loads may be placed upon such walls.

The above detailed description of an embodiment of the invention is provided by way of example only. Various details of design and construction may be modified without departing from the true spirit and scope of the invention as defined in the appended claims.

What is claimed is:

1. A protective cushioning device for attenuating generally horizontal shocks ordinarily applied to a smaller portion of a rigid vertical wall member having a larger given area, said device comprising:

resilient cushion means of flexible foam material for placement against the vertical wall member over the given area;

rigid plate means having an area substantially equivalent to said given area; and means secured to the plate means and extending about the perimeter of the cushion means for suspending said plate means contiguous with the cushion means, with the cushion means lying between the plate means and the vertical wall member, for relative movement horizontally toward said vertical wall member against the resilience of said cushion means in response to the application of said generally horizontal shocks to said plate means.

2. A protective cushioning device of claim 1 wherein said cushion means comprises a cushion fabricated of a flexible polyurethane foam.

3. In a cargo-carrying vehicle having at least one relatively rigid vertical wall, a protective cushioning device for attenuating generally horizontal shocks ordinarily applied to a relatively small portion of the area of the rigid vertical wall of the vehicle by horizontally shifting cargo within the vehicle, said device comprising:

a resilient cushion of flexible foam material for attachment to the rigid vertical wall and having an area sufficiently large to cover a relatively large portion of the area of the rigid vertical wall;

rigid plate means suspended contiguous with said resilient cushion between the cargo and the cushion for receiving shocks arising out of the impact of the cargo upon a relatively small area of the plate means and transmitting said shocks over the relatively large area of the resilient cushion; and flexible suspension means about the perimeter of the cushion between said vertical wall and said plate means and secured to the plate means for maintaining the plate means in vertical position contiguous with the cushion and allowing horizontal movement of the plate means against the cushion in response to said impact.

4. A protective cushioning device of claim 3 wherein said cushion is fabricated of a flexible polyurethane foam and said suspension means comprises a flexible fabric.

5. A protective cushioning device of claim 4 wherein said fabric is a vinyl-impregnated polyamide fabric.

6. A protective cushioning device for attenuating generally horizontal shocks ordinarily applied to a smaller portion of a rigid vertical wall member having a larger given area, said device comprising:

a resilient cushion of flexible foam material, said cushion having opposite first and second vertical faces and capable of being placed over the given area;

a relatively rigid backing plate member contiguous with the first face of said cushion and capable of being placed against the vertical wall member;

a relatively rigid face plate member having an area substantially equivalent to said given area for placement over the second face of said cushion; and flexible suspension means fixed to each said plate member along the perimeter of said cushion for suspending the face plate member vertically and contiguous with the cushion, with the cushion lying between the face plate member and the backing plate member, and allowing horizontal movement of the face plate member against the cushion in response to the application of said generally horizontal shock.

7. A protective cushioning device of claim 6 wherein the backing plate member is bonded to said first face of the cushion and said face plate member is bonded to said second face.

8. A protective cushioning device of claim 7 wherein said cushion is fabricated of a flexible polyurethane foam and said suspension means comprises a flexible fabric.

9. A protective cushioning device of claim 8 wherein said flexible fabric is a vinyl-impregnated polyamide fabric.

References Cited
UNITED STATES PATENTS

| | | | |
|---|---|---|---|
| 2,287,622 | 6/1942 | King | 49—487 |
| 3,067,699 | 12/1962 | Fredriks | 105—369 |
| 3,098,455 | 7/1963 | McElroy | 105—369 |
| 3,131,648 | 5/1964 | Seger | 105—369 |
| 3,145,853 | 8/1964 | Langenberg | 105—369 |
| 3,174,887 | 3/1965 | Voelker. | |

BENJAMIN HERSH, *Primary Examiner.*

P. GOODMAN, *Assistant Examiner.*